United States Patent
Fettke et al.

(10) Patent No.: US 12,485,500 B2
(45) Date of Patent: Dec. 2, 2025

(54) METHOD FOR MONITORING A LASER SOLDERING PROCESS, AND LASER SOLDERING SYSTEM USING A SPECTROSCOPE DEVICE

(71) Applicant: Pac Tech—Packaging Technologies GmbH, Nauen (DE)

(72) Inventors: Matthias Fettke, Berlin (DE); Timo Kubsch, Berlin (DE); Andrej Kolbasow, Paulinenaue (DE); Gero Bonow, Falkensee (DE)

(73) Assignee: PAC TECH—PACKAGING TECHNOLOGIES GMBH, Nauen (DE)

( * ) Notice: Subject to any disclaimer, the term of this patent is extended or adjusted under 35 U.S.C. 154(b) by 223 days.

(21) Appl. No.: 18/009,228

(22) PCT Filed: Jun. 9, 2021

(86) PCT No.: PCT/EP2021/065385
§ 371 (c)(1),
(2) Date: Dec. 8, 2022

(87) PCT Pub. No.: WO2021/259635
PCT Pub. Date: Dec. 30, 2021

(65) Prior Publication Data
US 2023/0219163 A1 Jul. 13, 2023

(30) Foreign Application Priority Data
Jun. 22, 2020 (DE) .................. 10 2020 116 394.0

(51) Int. Cl.
*B23K 26/03* (2006.01)
*B23K 1/005* (2006.01)
(Continued)

(52) U.S. Cl.
CPC .......... *B23K 26/032* (2013.01); *B23K 1/0056* (2013.01); *G01N 21/71* (2013.01);
(Continued)

(58) Field of Classification Search
CPC .. B23K 26/032; B23K 1/0056; B23K 3/0623; B23K 3/08; B23K 21/125; B23K 37/006;
(Continued)

(56) References Cited

U.S. PATENT DOCUMENTS

2006/0219760 A1* 10/2006 Wagoh .................. B23K 3/0623
228/248.1
2007/0246512 A1 10/2007 Kazi et al.
(Continued)

FOREIGN PATENT DOCUMENTS

CN 103192149 A 7/2013
CN 205571674 U 9/2016
(Continued)

OTHER PUBLICATIONS

PCT International Search Report and Written Opinion, PCT/EP2021/065385, Oct. 15, 2021, 17 pages.
(Continued)

*Primary Examiner* — Uzma Alam
*Assistant Examiner* — Justin J Van Cleave
(74) *Attorney, Agent, or Firm* — Quarles & Brady LLP

(57) ABSTRACT

A laser soldering system and a method for monitoring a laser soldering process by means of a monitoring device of the laser soldering system, wherein a solder ball is dispensed onto a solderable surface of a substrate by means of a solder ball feeding device of the laser soldering system, wherein the solder ball is at least partially melted by means of a laser device of the laser soldering system, wherein, during the laser soldering process, a light signal is formed which is detected by means of an optical detection unit of the
(Continued)

monitoring device, wherein the light signal is dispersed into a spectrum of the light signal by means of a spectroscope device of the monitoring device, wherein the spectrum is analyzed by means of a processing device of the monitoring device, and it is identified on the basis of a composition of the spectrum whether or not a burning of the substrate has occurred during the laser soldering process.

10 Claims, 2 Drawing Sheets

(51) Int. Cl.
    *G01N 21/71* (2006.01)
    *G01N 21/84* (2006.01)
    *G01N 21/88* (2006.01)

(52) U.S. Cl.
    CPC ..... *G01N 21/88* (2013.01); *G01N 2021/8411* (2013.01); *G01N 2201/126* (2013.01)

(58) Field of Classification Search
    CPC ...... B23K 26/062; G01N 21/71; G01N 21/88; G01N 2021/8411; G01N 2201/126; B21D 55/00
    See application file for complete search history.

(56) References Cited

U.S. PATENT DOCUMENTS

| | | | |
|---|---|---|---|
| 2011/0226744 A1 | 9/2011 | Heinz et al. | |
| 2012/0177810 A1* | 7/2012 | Mazumder | G01N 21/718 148/508 |
| 2015/0138545 A1* | 5/2015 | Day | G01J 3/0272 356/318 |
| 2017/0247797 A1* | 8/2017 | Zhou | F01D 5/005 |
| 2018/0099356 A1 | 4/2018 | Miyagi | |
| 2023/0201956 A1* | 6/2023 | Schwarz | B23K 1/0056 219/121.85 |

FOREIGN PATENT DOCUMENTS

| | | | | |
|---|---|---|---|---|
| CN | 106735897 A | | 5/2017 | |
| CN | 109668906 A | * | 4/2019 | ............ G01N 21/95 |
| DE | 102008045501 A1 | | 3/2010 | |
| DE | 112004002688 B4 | | 6/2010 | |
| EP | 0372812 A2 | | 6/1990 | |
| JP | H0215871 A | | 1/1990 | |
| JP | H04282407 A | | 10/1992 | |
| JP | H05131268 A | | 5/1993 | |
| JP | H077132 A | | 1/1995 | |
| JP | H0758448 A | | 3/1995 | |
| JP | H08172260 A | | 7/1996 | |
| JP | 2000101252 A | | 4/2000 | |
| JP | 2019072736 A | * | 5/2019 | |
| WO | 8705243 A1 | | 9/1987 | |
| WO | 2005051586 A1 | | 6/2005 | |
| WO | 2006093264 A1 | | 9/2006 | |

OTHER PUBLICATIONS

Japan Patent Office, Notice of Grounds of Rejection, Application No. 2022-576151, Apr. 2, 2024, 7 pages.
Korean Intellectual Property Office, Notice of Rejection, Application No. 10-2022-7043567, Feb. 19, 2025, 9 pages.

* cited by examiner

METHOD FOR MONITORING A LASER SOLDERING PROCESS, AND LASER SOLDERING SYSTEM USING A SPECTROSCOPE DEVICE

The present application is a national stage application filed under 35 U.S.C. § 371 of International Application No. PCT/EP2021/065385, filed Jun. 9, 2021, which claims priority to German Patent Application No. 10 2020 116 394.0, filed Jun. 22, 2020. Each of the aforementioned patent applications is incorporated by reference in its entirety for all purposes.

The disclosure relates to a method for monitoring a laser soldering process by means of a monitoring device of a laser soldering system and to a laser soldering system, comprising a solder ball feeding device for dispensing a solder ball onto a solderable surface of a substrate and a laser device for at least partially melting the solder ball.

From the state of the art it is sufficiently known to solder in particular chips, semiconductor devices or the like onto a substrate, which can for example be a printed board, by means of a laser soldering system. For this purpose, contact surfaces of the chip or the semiconductor device are connected to a solderable surface of the substrate, which in this context is also called "pad", via a solder ball. The solder ball for its part is dispensed onto the solderable surface by means of a solder ball feeding device of the laser soldering system and is at least partially melted by means of a laser device of the laser soldering system in such a manner that a material bond can be formed between the contact surfaces of the chip or the semiconductor device on the one hand and the solderable surface on the other hand.

During a laser soldering process, burning of the substrate can occur, wherein the term "burning" in this case is understood to mean in particular a thermal heating which does not necessarily take place under a formation of flames, said thermal heating involving a permanent damage to the substrate. The reason for such a burning can be a direct impact of a laser beam formed by means of the laser device on the substrate. However, the solderable surface and thereby the substrate thermally coupled to the solderable surface may also be thermally excited or heated by the solder ball hitting the solderable surface and being at least partially melted and thermally heated, in such a manner that a burning of the substrate is caused.

From the state of the art it is therefore known in laser welding processes, in which burning of a substrate of the aforementioned type can basically also occur, to monitor a laser welding process by means of a monitoring device of a laser welding system, in particular with the aim to identify whether or not a burning of a substrate has occurred during the laser welding process. For example, in the technical field of laser welding it is known to monitor a laser welding process by means of a thermographic camera.

Using a thermographic camera as a monitoring device for monitoring a laser soldering process of the kind described at the beginning proves, however, to be disadvantageous in view of the fact that a temporal and spatial resolution of a thermographic camera known from the prior art is not sufficient in order to clearly distinguish a portion of a light signal which is associated with a "normal" laser soldering process, in particular with melting the solder ball, from another portion of the light signal which is associated with a burning of the substrate. Furthermore, using a thermographic camera having an improved temporal and spatial resolution is a cost-intensive undertaking.

The object of the disclosure at hand is therefore to propose a method for monitoring a laser soldering process by means of a monitoring device of a laser soldering system and a laser soldering system by means of which a reliable and inexpensive monitoring of a laser soldering process can be performed.

This object is attained by a method having the features of claim 1 and by a laser soldering system having the features of claim 9.

In the method according to the disclosure for monitoring a laser soldering process by means of a monitoring device of a laser soldering system, a solder ball is dispensed onto a solderable surface of a substrate by means of a solder ball feeding device of the laser soldering system, wherein the solder ball is at least partially melted by means of a laser device of the laser soldering system, wherein, during the laser soldering process, a light signal is formed which is detected by means of an optical detection unit of the monitoring device, wherein the light signal is dispersed into a spectrum of the light signal by means of a spectroscope device of the monitoring device, wherein the spectrum is analyzed by means of a processing device of the monitoring device, and it is identified on the basis of a composition of the spectrum whether or not a burning of the substrate has occurred during the laser soldering process.

The term "burning" in this case is understood to mean in particular a thermal heating and/or excitation of the substrate, which leads or can lead to a damage to the substrate which permanently remains on the substrate. A formation of flames (fire) does not necessarily have to take place. Additionally, the term "burning" can also be understood to mean in very general terms a redox reaction of the substrate, which takes place under the release of energy in the form of heat or heat radiation and light.

The term "light", in particular in connection with the term "light signal", in this context is not limited to light which is visible to or perceptible with the naked eye, but can in general comprise the entire electromagnetic spectrum, in particular also infrared radiation (heat radiation) and ultraviolet radiation.

The term "solder ball" in this context is not necessarily understood to mean a ball-shaped object. Generally, the term "solder ball" can refer to solder material of any shape. For example, the solder ball can be present in a wire-like shape.

At the same time, the term "solder ball feeding device" can in very general terms be understood to mean a device by means of which a solder material can be dispensed onto a solderable surface.

The disclosure is based on the idea that a light signal which is formed during the laser soldering process is detected by means of an optical detection unit of the monitoring device and is then dispersed into a spectrum or spectral components of the light signal by means of a spectroscope device of the monitoring device. The spectrum is then analyzed by means of a processing device of the monitoring device, and it is identified on the basis of a composition of the spectrum, in particular on the basis of characteristic parameters describing the spectrum, whether or not a burning of the substrate has occurred during the laser soldering process. The characteristic parameters can in particular be substrate-dependent intensity peaks depending on a wavelength.

The method according to the disclosure in particular has the advantage that it is possible by means of the spectroscope device to make a clear differentiation between a portion of a light signal associated with a "normal" laser soldering process and a portion of the light signal which can be traced back to a burning of the substrate or to make a differentiation within the spectrum between a portion describing a "normal" laser soldering process and a portion describing a burning of the substrate. On the whole, the method according to the disclosure thus makes it possible to reliably and inexpensively monitor a laser soldering process.

The spectrum can comprise at least one substrate-independent normal portion and, in the case of a burning of the substrate occurring during the laser soldering process, can furthermore comprise a substrate-dependent burning portion, wherein a differentiation can be made by means of the processing device between the substrate-independent normal portion and the substrate-dependent burning portion. The term "substrate-dependent" in this context is to be understood to mean that a composition of the burning portion depends on a material or a material composition of the substrate, whereas the term "substrate-independent" indicates that a composition of the normal portion is independent of a material or a material composition of the substrate, i.e. essentially has an identical composition for any substrate. The substrate-independent normal portion can come from a "normally" proceeding laser soldering process and, thus, can always be a part of the spectrum. In particular, the substrate-independent normal portion can be caused by the melting and an associated thermal heating of the solder ball. Only in the case of a burning of the substrate occurring during the laser soldering process, the spectrum can additionally comprise the substrate-dependent burning portion which can be produced due to the burning. For instance, a direct impact of a laser beam formed by means of the laser device on the substrate leads to an excitation of electrons contained in the material or in the material composition of the substrate. An emission spectrum associated with this excitation can contribute to the substrate-dependent burning portion. By means of the processing device it is then possible to differentiate or distinguish between the substrate-independent normal portion and the substrate-dependent burning portion and to identify a material involved in the burning or a material composition involved in the burning on the basis of spectral information.

In an advantageous embodiment of the method it can be identified by means of the processing device on the basis of a presence of the substrate-dependent burning portion in the spectrum whether or not a burning of the substrate has occurred during the laser soldering process. For instance, if the spectrum, additionally to the substrate-independent normal portion, also comprises a substrate-dependent burning portion, the processing device can identify on the basis of this presence of the substrate-dependent burning portion in the spectrum whether or not a burning of the substrate has occurred. In this case, the substrate-independent normal portion of the processing device can be known and can be stored in a database of the processing device. For example, the processing device can then access the stored substrate-independent normal portion for the identification and can subtract or deduct it from a spectrum detected by means of the optical detection unit and can determine whether, after the subtraction or deduction, still another portion is present in the spectrum, which can then be identified with the burning portion.

Furthermore, on the basis of a composition of the substrate-dependent burning portion, a material or a material composition of the substrate can be determined by means of the processing device. Thus, an excitation, which is for example induced by a laser device, of electrons which are present in the material or the materials of the substrate leads to the formation of an emission spectrum (spectral fingerprint) which is characteristic of the material or the materials or the material composition, the material or the material composition of the substrate being capable of being determined or identified on the basis of said emission spectrum. If the material or the material composition of the substrate is known, the determination can also serve as a control in order to determine whether or not a portion occurring in the spectrum additionally to the substrate-independent normal portion is really to be traced back to a burning of the substrate.

Advantageously, the determination can be carried out by means of a comparison of characteristic parameters of the substrate-dependent burning portion with characteristic parameters which are stored in a database of the processing device and which spectroscopically describe a plurality of different materials or material compositions of substrates. In particular, the characteristic parameters can be intensity peaks depending on a wavelength.

Advantageously, it can be output by means of the processing device whether or not a burning of the substrate has occurred during the laser soldering process. For this purpose, the processing device can, for example, output an acoustic and/or optical signal which can inform an operator of the laser soldering system that a burning of the substrate has occurred. The operator can then, if necessary, manually stop an operation of the laser soldering system and sort out the substrate damaged due to the burning.

Furthermore, an operation of the laser soldering system can be stopped in the case of a burning of the substrate occurring during the laser soldering process. Advantageously, the operation of the laser soldering system can be interrupted automatically in such a case. By stopping the operation of the laser soldering system, it is possible to prevent further burning.

The light signal can be formed due to the melting of the solder ball and, in the case of a burning occurring during the laser soldering process, additionally due to the burning. In this case, the melting of the solder ball can contribute to the substrate-independent normal portion and the burning can contribute to the substrate-dependent burning portion of the spectrum. In this case, the contribution due to the melting of the solder ball can in particular be traced back to infrared or heat radiation emitted by the thermally heated solder ball, whereas the contribution due to the burning can in particular be traced back to both infrared or heat radiation emitted by the thermally heated substrate and light emitted by the burning of the substrate and being visible to the naked eye.

The laser soldering system according to the disclosure comprises a solder ball feeding device for dispensing a solder ball onto a solderable surface of a substrate and a laser device for at least partially melting the solder ball, wherein the laser soldering system comprises a monitoring device for monitoring a laser soldering process, wherein the monitoring device has an optical detection unit for detecting a light signal which is formed during the laser soldering process and a spectroscope device for dispersing the light signal into a spectrum of the light signal, wherein the monitoring device has a processing device by means of which the spectrum is capable of being analyzed and it is possible to identify on the basis of a composition of the spectrum whether or not a burning of the substrate has occurred during the laser soldering process. With respect to the advantageous effects of the laser soldering system according to the disclosure, reference is made to the description of advantages of the method according to the disclosure.

Advantageously, the optical detection unit comprises at least one convergent lens. The convergent lens can then collect light associated with the light signal and can transfer it to the spectroscope device.

Advantageously, the laser soldering system can comprise a glass fiber assembly by means of which the light signal is transmittable from the optical detection unit to the spectroscope device.

In an advantageous embodiment of the laser soldering system, the processing device can comprise a database in which a plurality of characteristic parameters which spectroscopically describe different materials or material compositions of substrates is capable of being stored. The processing device can in particular be a computer whose hard disk can form the database.

Further advantageous embodiments of the laser soldering system are apparent from the descriptions of features of the dependent claims referring back to method claim 1.

Below, preferred embodiments of the disclosure are explained in more detail with reference to the accompanying drawings.

Figure 1:
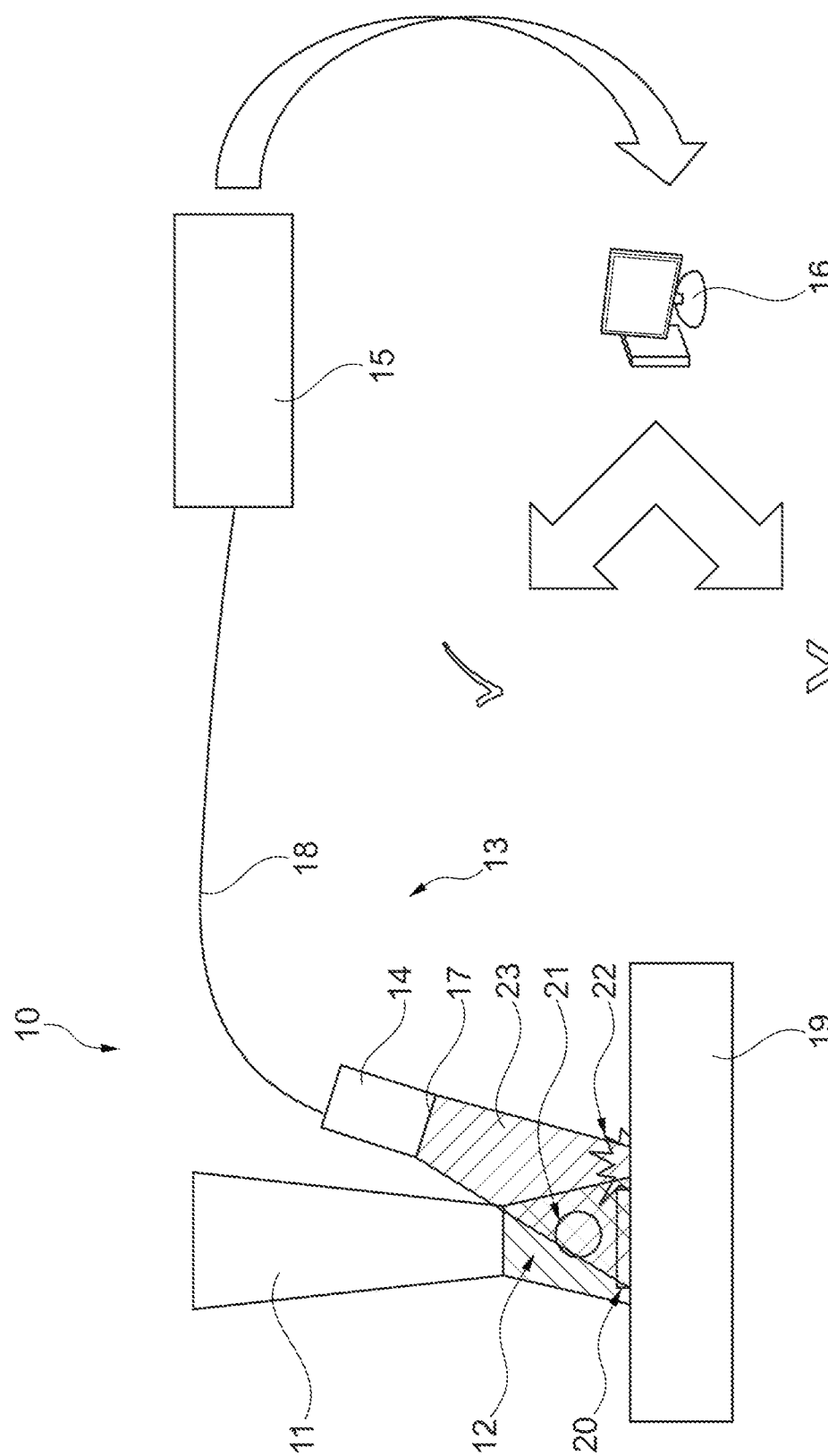
FIG. 1 shows a schematic illustration of a laser soldering system.

FIG. 1 shows a schematic illustration of a soldering system 10 which comprises a solder ball feeding device 11 for dispensing a solder ball 21 onto a solderable surface 20 of a substrate 19 and a laser device (not shown in the case at hand) for at least partially melting the solder ball 21. In this case, a laser beam 12 can be formed by means of the laser device, said laser beam, on the one hand, causing the partial melting of the solder ball 21 by impacting on the solder ball 21 and, on the other hand, as shown in FIG. 1, also causing a burning 22 of the substrate 19 by directly impinging on the substrate 19. Due to the melting of the solder ball 21 and due to the burning 22 a light signal 23 is formed.

Furthermore, the laser soldering system 10 comprises a monitoring device 13 having an optical detection unit 14 for detecting the light signal 23. Furthermore, the optical detection unit 14 comprises a convergent lens 17. The light signal 23 is then transmitted from the optical detection unit 14 to a spectroscope device 15 of the monitoring device 13 via a glass fiber assembly 18 of the laser soldering system 10, the light signal 23 being dispersed into a spectrum of the light signal 23 (not shown in the case at hand) by means of said spectroscope device 15. Moreover, the monitoring device 13 has a processing device 16 by means of which the spectrum can be analyzed, and it is possible to identify on the basis of a composition of the spectrum whether or not a burning 22 of the substrate 19 has occurred during the laser soldering process. An operation of the laser soldering system 10 is stopped in the case of a burning 22 of the substrate 19 occurring during the laser soldering process, in particular in order to prevent further burning 22.

Figure 2:
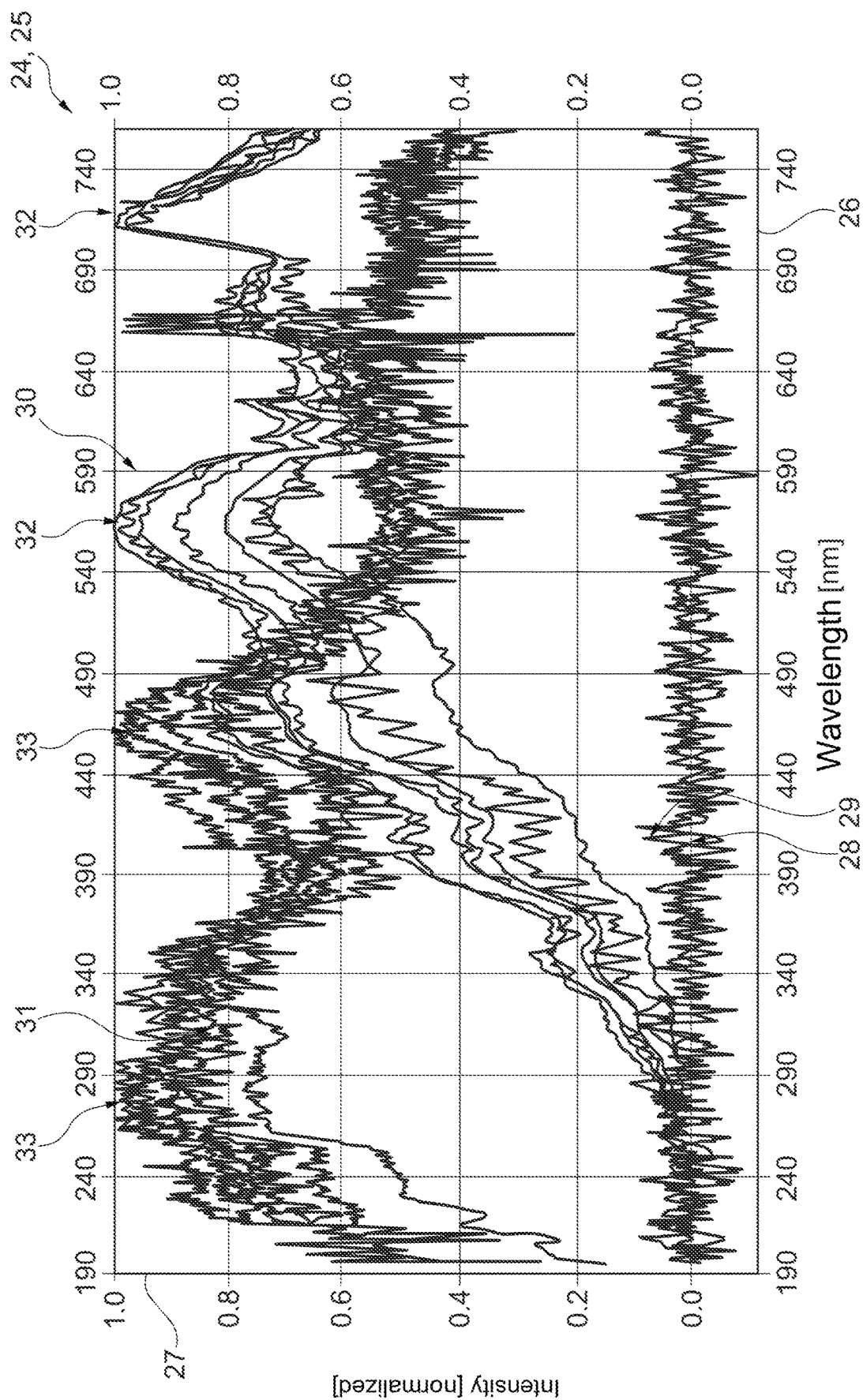
FIG. 2 shows a diagrammatic illustration of a spectrum for two different laser soldering processes.

FIG. 2 shows a spectrum 24 and a spectrum 25 for two different laser soldering processes. In this case, a wavelength in nanometers is illustrated on the axis of abscissas 26 and an intensity in any unit is illustrated on the axis of ordinates 27. The spectrum 24 and 25 comprises a substrate-independent normal portion 28 and 29, respectively, wherein the normal portion 28 essentially coincides with the normal portion 29. Furthermore, the spectrum 24 and 25 comprises a substrate-dependent burning portion 30 and 31, respectively. In the case at hand, it is in particular visible that intensity peaks 32 of the burning portion 30, in particular with respect to a position relative to the axis of abscissas 26, are clearly different from intensity peaks 33 of the burning portion 31. Thus, the burning portions 30 and 31 and the spectrums 24 and 25 come from different substrate types and/or substrates having different materials or material compositions. The position and the height of the intensity peaks 32 and 33 represent a kind of spectral fingerprint on the basis of which a material or a material composition of a substrate can be determined.

The invention claimed is:

1. A method for monitoring a laser soldering process by means of a monitoring device of a laser soldering system, the method comprising the steps of,
    dispensing a solder ball onto a solderable surface of a substrate with a solder ball feeder of the laser soldering system;
    at least partially melting the solder ball with a laser device of the laser soldering system;
    forming a light signal during the laser soldering process and detecting the light signal with an optical detection unit of the monitoring device;
    dispersing the light signal into a spectrum of the light signal with a spectroscope device of the monitoring device;
    analyzing the spectrum with a processing device of the monitoring device, and on the basis of a composition of the spectrum, identifying that a burning of the substrate has occurred during the laser soldering process by identifying that the spectrum comprises a substrate-dependent burning portion; and
    differentiating between a substrate-independent normal portion and the substrate-dependent burning portion with the processing device.

2. The method according to claim 1, further comprising the step of determining a material or a material composition of the substrate based on a composition of the substrate-dependent burning portion.

3. The method according to claim 2, wherein the determination is carried out by comparing characteristic parameters of the substrate-dependent burning portion with characteristic parameters which are stored in a database of the processing device and which spectroscopically describe a plurality of different materials or material compositions of substrates.

4. The method according to claim 1, further comprising the step of outputting whether or not a burning of the substrate has occurred during the laser soldering process with the processing device.

5. The method according to claim 1, further comprising the step of stopping an operation of the laser soldering system when a burning of the substrate is identified during the laser soldering process.

6. The method according to claim 1, wherein the light signal is formed due to at least one of the melting of the solder ball and the burning occurring during the laser soldering process.

7. A laser soldering system, comprising a solder ball feeder for dispensing a solder ball onto a solderable surface of a substrate and a laser device for at least partially melting the solder ball, wherein the laser soldering system comprises a monitoring device for monitoring a laser soldering process, wherein the monitoring device has an optical detection unit for detecting a light signal which is formed during the laser soldering process and a spectroscope device for dispersing the light signal into a spectrum of the light signal, wherein the monitoring device has a processing device by means of which the spectrum is capable of being analyzed to identify on the basis of a composition of the spectrum whether or not a burning of the substrate has occurred during the laser soldering process, and wherein the spectrum comprises at least one substrate-independent normal portion and, in the case of a burning of the substrate occurring during the laser soldering process, furthermore comprises a substrate-dependent burning portion, wherein a differentiation is made between the substrate-independent normal portion and the substrate-dependent burning portion by means of the processing device.

8. The laser soldering system according to claim 7, wherein the optical detection unit comprises at least one convergent lens.

9. The laser soldering system according to claim 7, wherein the laser soldering system comprises a glass fiber assembly by means of which the light signal is transmittable from the optical detection unit to the spectroscope device.

10. The laser soldering system according to claim 7, wherein the processing device comprises a database in which a plurality of characteristic parameters which spectroscopically describe different materials or material compositions of substrates is capable of being stored.

* * * * *